(12) United States Patent
Yan et al.

(10) Patent No.: US 7,060,236 B2
(45) Date of Patent: Jun. 13, 2006

(54) PROCESS FOR REMOVING VOLATILE ORGANIC COMPOUNDS

(76) Inventors: Tsoung Y. Yan, 2427 Fairmount Ave., Philadelphia, PA (US) 19130; Jen-Ray Chang, No. 549 Shin-Sheng Rd., Chia-Yi (TW)

(*) Notice: Subject to any disclaimer, the term of this patent is extended or adjusted under 35 U.S.C. 154(b) by 646 days.

(21) Appl. No.: 10/274,551

(22) Filed: Oct. 21, 2002

(65) Prior Publication Data

US 2004/0076568 A1 Apr. 22, 2004

(51) Int. Cl.
*C07C 11/24* (2006.01)
(52) U.S. Cl. .................. 423/245.3; 588/320; 588/405
(58) Field of Classification Search ............... 588/313, 588/315, 316, 320, 321; 423/240 S, 245.1, 423/245.3
See application file for complete search history.

(56) References Cited

U.S. PATENT DOCUMENTS

| | | | | |
|---|---|---|---|---|
| 5,254,512 A | | 10/1993 | Ueda et al. ................. 502/52 |
| 5,460,792 A | * | 10/1995 | Rosenbaum ............. 423/245.3 |
| 5,531,901 A | * | 7/1996 | Miyabe et al. ............. 210/668 |
| 5,762,893 A | * | 6/1998 | Scholz et al. ............ 423/240 S |
| 6,051,199 A | | 4/2000 | Teller ...................... 423/245.1 |

* cited by examiner

*Primary Examiner*—Edward M. Johnson

(57) ABSTRACT

A continuous and regenerative process for removal and destruction of VOC from effluents is disclosed. The process employs two fixed bed reactors in series filled with adsorbent/catalyst. The VOC containing effluent is passed over the first reactor for adsorbing VOC, while the second reactor, which is loaded with VOC from the previous cycle is regenerated with part of the treated gas made up with an appropriate amount of air. Just before the VOC breakthrough occurs at the first reactor, the roles of the two reactors are switched. The process is characterized by simple design, high VOC removal efficiency, no external heat requirement and low operation cost.

16 Claims, 1 Drawing Sheet

Figure
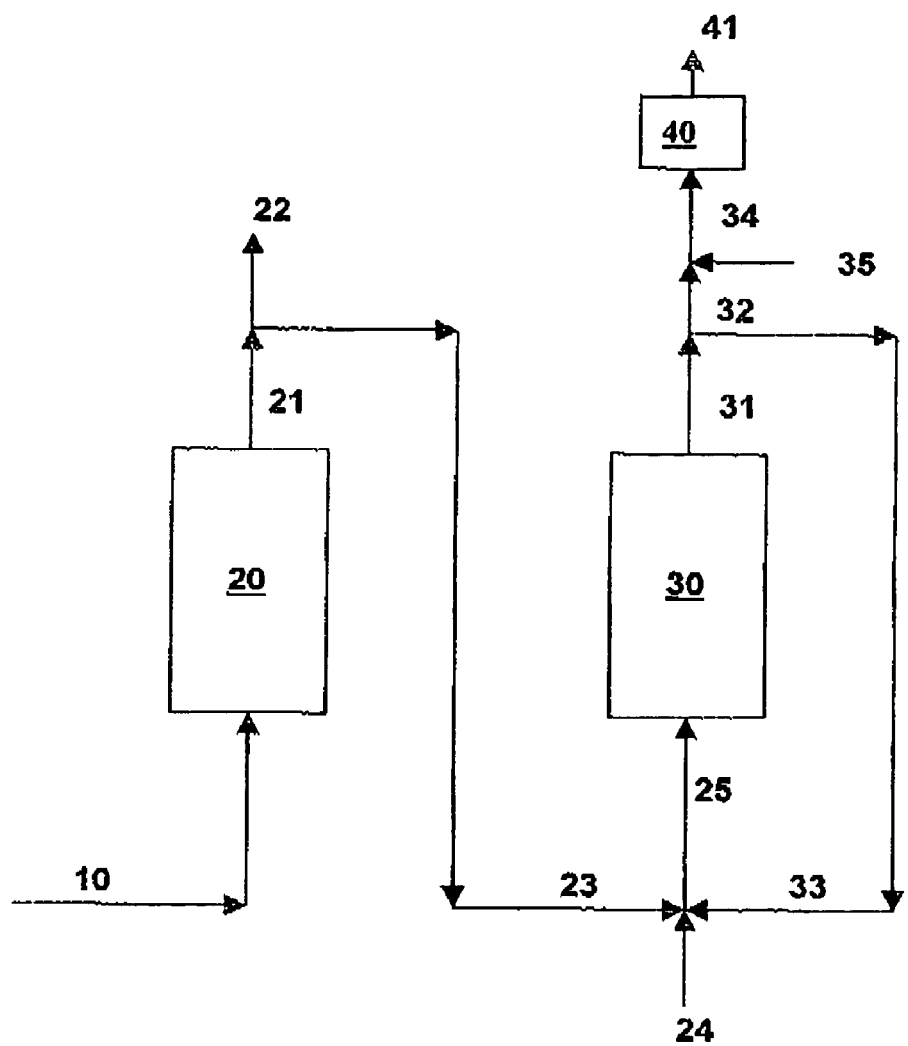

PROCESS FOR REMOVING VOLATILE ORGANIC COMPOUNDS

CROSS-REFERENCE TO RELATED APPLICATION

Not applicable

BACKGROUND—FIELD OF INVENTION

This invention relates to a process to remove and destroy volatile organic compounds (VOC) contained in the effluents of industrial and commercial processes, continuously. More particularly, it relates to a system employing two fixed bed reactors containing adsorbent/catalyst for continuously adsorbing VOC from the effluents and converting VOC laden on the adsorbent/catalyst to benign carbon dioxide and water for safe disposal.

BACKGROUND—DESCRIPTION OF PRIOR ART

The effluents from industrial and commercial process can often contain VOC, which are malodorous, harmful organic solvents and hydrocarbons. In this discussion, the effluent means a waste gas containing VOC for treating. Conventional VOC control systems typically utilize combustion processes for conversion of VOC into benign, non-noxious compounds such as carbon dioxide and water Traditional combustion processes include. (1) thermal destruction of the VOC; (2) thermal destruction of the VOC with heat recovery; (3) catalytic thermal destruction of the VOC and (4) a three-step process where first VOC are removed from a waste stream and concentrated using an adsorbent, then the adsorbent is regenerated using a smaller quantity of air or other gas which creates a concentrated process stream, and finally the VOC are destroyed in an additional processing unit. Both the direct and catalytic combustion methods require a lot of fuel and increase operation cost, particularly when the VOC contents in the effluent are low. The thermal requirement can be reduced by adding equipment to recover some of the waste heat from the combustion, such as the method (4) shown above. However, the energy savings are achieved by employing complicated operation, which have increased capital cost. The conventional methods cannot save both energy and capital cost at the same time.

There are patents that disclose apparatus for continuous adsorption of VOC on, and regeneration of the adsorbent. For example, U.S. Pat. No. 5,254,512 to Ueda et al. discloses a method for treating gas and regenerating catalyst portion by portion. The method is for continuously treating a gas using an apparatus with a catalyst bed housed therein comprises passing the effluent through the catalyst bed to adsorb the VOC, and passing a regenerating gas through the catalyst bed adsorbed by the VOC in the effluent to react and decompose them and simultaneously regenerate the catalyst bed. The catalyst bed is rotatatable and this regeneration portion is a portion of the catalyst bed and moves portion to portion in the catalyst bed sequentially and periodically. The direction of motion may be rotational around the center of the catalyst bed when the catalyst bed is circular or may be sliding along the catalyst bed when the catalyst bed is square. In this process, the catalyst beds have to be rotatable or sildeable which increase the complexity of the unit construction, operation and maintenance. The regeneration operation is not well controlled which can lead to temperature runaway, catalyst damage, fire and safety hazards. In fact, a fire did take place in a commercial plant. To minimize the safety hazard, the quantity of adsorption per bed movement is limited to low, leading to a low treating capacity. In one of a commercial plant, the VOC adsorption is limited to about 1% based on the adsorbent, despite of the fact that the adsorption capacity of the adsorbent is well over 10%. In other word, the whole adsorption capacity of the adsorbent cannot be fully utilized. With limited treating capacity, it is difficult to treat the effluents with great variations in flow rate and VOC concentration. In U.S. Pat. No. 6,051,199 to Teller, an integrated catalytic/adsorption process for destroying volatile organic compounds is disclosed. There is some improvement but it is basically similar to that disclosed in U.S. Pat. No. 5,254,512. The method utilizes a bed containing both adsorbing material and catalytic material. During the operation, one section of the bed collects VOC from the effluent while simultaneously, in another part of the bed, collected VOC are destroyed and the bed material is regenerated. This process can continuously eliminate VOC from an effluent without interruption by rotating the bed through the adsorption and regeneration zones. The drawbacks of this process remain similar to those disclosed in U.S. Pat. No. 5,254,512. The movable bed makes equipment construction complex and expensive, and both unit operation and maintenance costs are high. The regeneration step is not well controlled which can lead to temperature run away, catalyst damage, fire and safety hazards. In order to assure safety, the quantity of VOC adsorbed is limited to low levels leading to low capacity and high operation cost. It is difficult to handle the effluent with great fluctuations in flow rate and VOC concentration. Thus, the unit has to be greatly oversized leading to higher capital cost.

The prior art for removal and destruction of VOC suffers from a number of disadvantages including:
1) High energy requirement: In direct combustion, external fuel or heat has to be added to get the reaction going, because the VOC content in the effluent stream is too low to sustain the combustion.
2) Complicated equipment and high capital cost: To save energy, complicated equipment is required to recoup the heat from the hot gases, leading to high capital cost.
3) Rotatable catalyst bed: To make the adsorption of VOC and regeneration of VOC loaded catalyst continuously, rotatable catalyst bed is generally used. With the rotatable catalyst bed, the apparatus is costly to construct, operate and maintain.
4) Potential fire and safety hazards: The regeneration step is not well controlled leading to potential temperature runaway, fire and safety hazards.
5) Low treating capacity and inefficient operation: To be safe, the adsorption cycle is limited in length to reduce the quantity of VOC adsorption on the catalyst, leading to low treating capacity and high operation cost.
6) Low flexibility in treating effluent with high fluctuation in VOC concentration: To be safe for operation, the apparatus is highly oversized to accommodate the effluent stream with high fluctuation in VOC contents.

Clearly, there is a need in the industry for an energy efficient, low capital cost, flexible and safe system for VOC removal and destruction The disclosures of the above patents are incorporated herein by reference.

SUMMARY OF THE INVENTION

The present invention provides a continuous and regenerative process for removing VOC from effluents and regenerating VOC loaded catalysts. In particular, the process employs two fixed bed reactors in series filled with adsorbent/catalyst. The VOC containing effluent is passed over the first reactor for adsorbing VOC from the effluent, and part of the treated gas is made up with an appropriate amount of air or hot regenerator exhaust gas to form a regeneration gas. The regeneration gas is passed over the second reactor to regenerate the adsorbent/catalyst, which is loaded with VOC from the previous cycle and to convert the VOC into innocuous compounds such as carbon dioxide and water Just before the VOC breakthrough occurs at the reactor, the effluent is switched to the second reactor while the regeneration gas is switched to the first reactor to start another operation cycle By controlling the $O_2$ concentration in the regeneration gas, the regenerator temperature is controlled within the safe range, and the regeneration rate is controlled so as to make the regeneration cycle length slightly shorter than the adsorption cycle length By recycling an appropriate amount of hot regenerator exhaust gas to make up the regeneration gas, addition of external heat to the process becomes almost unnecessary. The process is characterized by using fixed bed reactors of simple design, high VOC removal efficiency, requiring no or little external heat, high and flexible treating capacity, low costs of operation and maintenance and most importantly, safe to operate.

OBJECTS AND ADVANTAGES

Accordingly, several objects and advantages of present invention are:
1) To provide a process for removal and destruction of VOC with high thermal efficiency, requiring little or no external heat addition.
2) To provide a process for removal and destruction of VOC with a simple reactor system and low capital cost.
3) To employ simple, low cost and rugged fixed bed reactor instead of rotatable catalyst beds.
4) To control the regeneration step closely to assure safety of the operation.
5) To provide a process for removal and destruction of VOC with high treating capacity, long operation cycles and high operation efficiency.
6) To provide a process for removal and destruction of VOC with high flexibility to treat the effluents which fluctuate significantly in VOC concentration and flow rate.

Further objects and advantages will become apparent from a consideration of the ensuing description and drawing.

BRIEF DESCRIPTION OF THE DRAWING

The embodiment of the invention illustrated in the schematic drawing, FIG. 1, shows a system consisting two fixed bed reactors in series, which are interconnected with pipes and valves to switch process flow to treat and destruct VOC contained in the effluent.

DESCRIPTION OF THE INVENTION

In accordance with the present invention, an essentially continuous and regenerative process for removing VOC from effluents, and destroying the adsorbed VOC and regenerating VOC loaded catalysts, simultaneously is provided. The critical elements of the process in present invention are three, namely, active and high capacity adsorbent/catalyst, novel process flow and configuration, and proper operating procedures and conditions.

Adsorbent/Catalyst

In the present invention, two fixed bed reactors filled with adsorbent/catalyst in series are employed to adsorb VOC from the effluents, and convert the adsorbed VOC to innocuous carbon dioxide and water and regenerate the VOC loaded adsorbent/catalyst simultaneously The adsorbent/catalyst is porous materials with surface areas greater than 50 $m_2/g$, preferably, greater than 100 $m_2/g$. The useful materials are activated carbon, silica, alumina, silica-alumina and zeolites of types including A, X, Y, Mordenite, Beta, ZSM-5, ZSM-11, ZSM-12, ZSM-22, ZSM-22, ZSM-23, ZSM-35 and MCM-48 and their mixtures. Owing to its high surface area and special affinity to the VOC, zeolites are preferred adsorbent/catalyst.

Since the effluent streams often contain water in addition to VOC, adsorbent/catalyst with hydrophobic surface, in turn, high adsorption selectivity for VOC over water is preferred. Zeolites with high silica/alumina ratio in excess of, say, 20, start to show hydrophobic property. Thus, Zeolites with high silica/alumina ratio greater than 20 are preferred. The surfaces of activated carbon are generally hydrophilic because of the presence of polar group such as hydroxyl and carboxyl groups However, these groups can be removed thermally at high temperatures greater than about 400° C. Thus, the activated carbon can be pretreated at high temperatures before use to improve its adsorption selectivity for VOC.

In the present invention, the adsorbent/catalyst has to experience repeated cycles of adsorption and high temperature regeneration, so that its surface areas have to be stable hydro-thermally. It has been found that the hydrothermal stability of zeolites generally increases with increase in its silica-alumina ratio. As a result, Zeolites with silica/alumina ratio equal or greater than 10 are preferred. In addition, it has been discovered that the thermal stability can be greatly increased by controlled high temperature steaming. Zeolite Y can be steamed at high temperature to change the structure to obtain "Ultra Stable Y", which is preferred for use in the present invention. Further, it has been discovered that the hydrothermal stability of zeolites can be increased significantly by ion exchange of the counter ion in the zeolites. For example, the hydrothermal stability of NaY can be greatly improved by exchanging the Na with rare earth (RE) ions. Thus, REX is preferred over REY for use in the present invention. Similarly, the hydrothermal stability of NaA (known as 4A) can be improved by exchanging the Na with Ca to form CaA (known as 5A). Thus, 5A is preferred over 4A for use in the present invention. Since the VOC can be mixtures of compounds of different molecular sizes, it is desirable to use mixtures of zeolites with different pore sizes. For example, it is desirable to mix large pore Zeolites, such as USY or Beta with medium pore zeolites, such as ZSM-5 or Ferrierite to form an effective compounded adsorbent.

It is desirable that the adsorbent of the present invention requires the catalytic activity for oxidation so that the regeneration can takes place at lower temperatures. Thus, the adsorbent/catalyst of the present invention is dual functional and serves to adsorb VOC and oxidize adsorbed VOC catalytically The adsorbent/catalysts shown above have some catalytic oxidation properties. However, it is desirable to boost the catalytic oxidation activity by incorporating in it some catalytic oxidation components. Thus the adsorbent/catalyst will become dual functional to adsorb the VOC from the effluent in the adsorption reactor and catalyze the oxidation reaction to convert the adsorbed VOC in the regeneration reactor. The useful catalytic oxidation components are metals and metal oxides In the present invention, useful adsorbent/catalyst may contain metals from Group IB, IIB, IVB, VIB, VIIB or VIII of the Periodic Table of the Elements, published by Sargent-Welch of Skokie, Ill. Within the group, Ni, Mo, Co, Pt, Pd, Rh, Ru, Ag, Au, Cu, Cr, Fe, Mn, Ti, Zr and Zn are preferred. Pt, Pd, Ni, Co and Cr are most preferred metals.

The metal loading required depends on the type of the metals. For precious metals, such as Pt and Pd, the metal loading can be in the range of 0.001% to 10.0%, and 0.01% to 2.0% is preferred. For the base metals, such as Ni, Co and Cr, the metal loading can be in the range of 0.01% to 20% and 0.1% to 5% is preferred.

The metals can be incorporated to the adsorbent/catalyst by means including ion exchange, impregnation, mulling as well as physical mixing.

In refineries, there are spent catalysts, which cause environmental concerns. Researchers around the world are working hard to find proper disposal methods to handle these spent catalysts. There are other researchers who work hard to reuse these spent catalysts in other applications. The refinery spent solid catalysts include FCC cracking, hydrodesulfurization, hydrocarcking, and hydrogeneation catalysts. They are made of supports with surface area in the range of 50 to 500 $m_2/g$ and metals of Ni, Co, Mo, V, W etc. in a range of 0.1 to 20%. It has been discovered that such spent catalysts are good adsorbent/catalyst for application in the present invention. These spent catalysts can be obtained not only without cost but also with tipping fees. It is most important that a waste catalyst is reused, contributing to environmental conservation.

In the present invention, the adsorbent/catalyst can be used in various forms of shapes and sizes, including monolithic, pellets, cylinder, hollow cylinder and tri- and qualobes. For present invention, hollow cylinder and tri-lobes are preferred. However, when the pressure drop through the reactor becomes critical, monolithic will be preferred.

Process Configuration

A preferred embodiment of the present invention is shown in FIG. 1. In accordance with the drawing, the fixed bed reactors, 20 and 30 are filled with adsorbent/catalyst. The VOC containing effluent stream from line 10 is charged into reactor 20 for adsorption of VOC. In reactor 20 at adsorption mode, over 98% of VOC are removed. The treated clean effluent stream exit from reactor 20 through line 21 and vented to the atmosphere through pipe 22. If the treated clean effluent stream is lower in $O_2$ concentration than that required for regeneration gas, part of this treated effluent stream is directed through line to mix appropriate amount of air or oxygen from line 24 to form regeneration gas On the other hand, if the treated clean effluent stream is higher in $O_2$ concentration than that required for regeneration gas, part of this clean effluent gas is mixed with appropriate amount of the regenerator exhaust gas from line 33 to form regeneration gas. In this case, the external air or oxygen from line 24 still not be required. The regeneration gas is fed to reactor 30 through line 25 The hot exhaust gas 33 also provides the heat to bring up the regeneration gas to approximately the take off temperature for combustion. To adjust the $O_2$ concentration and temperature of regeneration gas 25, a heat removal means (not shown) has to be provided to remove and recover the excess heat for use elsewhere. In reactor 30, VOC adsorbed on the adsorbent/catalyst from the previous adsorption cycle is converted to innocuous carbon dioxide and water through oxidation, and the adsorbent/catalyst are regenerated for reuse in the next adsorption cycle. However, during the regeneration, the hot exiting gas 32 could contain some VOC due to hot gas stripping of the VOC loaded adsorbent in the bed downstream. In addition, the exiting gas 32 could also contain some incomplete combustion products, such as CO and organic acids. If this is the case, exiting gas 32 is added with appropriate amount of air 33 to form gas mixture 34, which is introduced into the trim catalytic combustor 40 for complete oxidation. The trim catalytic combustor is filled with oxidation catalyst containing Pt, Pd, Ni Co, Fe or Mn or their mixtures. The exhaust gas from the trim catalytic combustor 40 is clean gas and vented to the atmosphere.

The oxidation reaction is highly exothermic and the reaction can sustain itself without external fuel or heat In fact, the oxidation rate has to be controlled by limiting the $O_2$ concentration in the regeneration gas to avoid temperature runaway. The proper concentration of $O_2$ in the regeneration gas for the present invention will be discussed in the next section. The VOC adsorbed on the adsorbent/catalyst can be considered as "soft coke" and can be burnt and oxidized at relatively low temperatures, particularly when a dual functional adsorbent/catalyst with oxidation catalytic activity is used. For typical adsorbed VOC, this oxidation take-off temperature can range from 100 to 300 C, which is generally higher than the treated effluent from the first reactor 20. Thus, it is necessary to heat up the regeneration gas to the take-off temperature at the beginning of the regeneration cycle. After the reaction takes off, the oxidation can sustain itself without further heating. This heating of regeneration gas can be achieved by use of a heater, a heat exchanger, an in-line heater or direct mixing with appropriate amount of hot regenerator exit gas from line 33 into line 23. The clean hot exhaust gas from the second reactor 30 exits through line 31, mixed appropriate amount of air through line 35, completely oxidized in the trim catalytic combustor 40, and vented to the atmosphere through line 41. Part of the clean hot regenerator exhaust gas is mixed with the regeneration gas through line 33 to raise the regeneration gas at the start of the regeneration cycle to initiate the regeneration.

The flow rate of air into the regeneration gas, and in turn, the second reactor 30 for regeneration is used to control the rate of regeneration, and the regeneration cycle length. The regeneration cycle length is controlled to be slightly shorter than the adsorption cycle length by say, 1 to 10 hours. During this period, the regeneration is complete and there is nothing to burn, so that the second reactor can be cooled down to be ready for the next cycle of adsorption Just before the VOC is to breakthrough the first reactor, the mode of operation is changed by switching the gas flow to make reactor 30 the absorber and reactor 20 the regenerator to start a new operation cycle The breakthrough of VOC can be detected with a combustible gas probe near the exit of the absorber.

Process Conditions and Control

According to the present invention, VOC in the effluent gas are adsorbed on the adsorbent/catalyst in the first reactor. The operating conditions are chosen to adsorb the VOC effectively and completely to a level of 98% removal or better. Thus, the treated effluent gas can be vented to the atmosphere without environmental concerns. The ranges of operation conditions for the absorber are:

| Process Parameter | Broad Range | Preferred Range |
|---|---|---|
| Adsorption Capacity, g/g | 0.01 to 0.3 | 0.02 to 0.2 |
| Temperature, °C. | 0 to 100 | 10 to 50 |
| Pressure, psig | 0 to 200 | 0 to 50 |
| Cycle length, Hrs | 0.1 to 1,000 | 1 to 500 |
| GHSV, g/g. Hr | 0.1 to 1,000 | 1 to 500 |

The unit is generally operated at the temperature and the pressure of the effluent to be treated. These conditions are well within the design capability of the unit of the present invention. The adsorption cycle length is calculated by:

Cycle length, Hr=Adsorption Capacity (g/g)/VOC Conc. (g/g)×GHSV (g/g. Hr)

Where,
  Adsorption Capacity is adsorption capacity of adsorbent for VOC, g/g
  VOC Conc is Fraction of VOC contained in the effluent gas, g/g
  GHSV is gas hourly space velocity, g/g. Hr It is desirable to control the adsorption cycle length at about 100 hrs, to minimize the frequency of unit switchings and the operation cost. It is more important to have a cycle length long enough to smooth out the short-term fluctuations in effluent gas flow rate and it's VOC content. If the cycle length is shorter than the period of fluctuation, the adsorption operation can become unstable and inefficient. The adsorption cycle lengths of the apparatuses based on rotatable catalyst beds as disclosed in the U.S. Pat. Nos. 5,254,512 and 6,051,199 are too short to handle such fluctuations It is the novel feature of the present invention to use fixed bed reactors in series that makes it possible to extend the cycle length of adsorption long enough to handle such fluctuations Thus, the VOC removal process of the present invention is characterized by high efficiency, robustness and stability of the operation.

The regeneration step is the most critical in the operation system. The important parameters in designing and operating the regenerators are: (1) The temperature of the regeneration gas at the start of regeneration cycle has to be controlled to initiate the oxidation reaction properly. (2) The oxygen concentration in the regeneration gas has to be controlled to limit the temperature rise and the maximum regenerator temperature within the set safety limit. (3) The flow rate of the regeneration gas is controlled to control the rate of regeneration and the regeneration cycle length to be 1 to 24 hours shorter than the adsorption cycle length. By controlling these process parameters, the unique features of the regeneration in the present invention, namely, (1) low external heat requirement, (2) safety, and (3) regeneration rate controlled to match the adsorption cycle length are achieved. The operable ranges for these parameters are shown below.

| Parameters | Broad Range | Preferred Range |
|---|---|---|
| Takeoff Temperature, °C. | 100 to 500 | 200 to 400 |
| O2 Conc. in Reg. Gas, wt % | 0.1 to 20 | 0.5 to 10 |
| Reg. Gas, GHSV, g/g. Hr | 0.01 to 100 | 0.05 to 50 |
| Delta T. Max. °C. | 100 to 600 | 200 to 500 |
| Regenerator Temp. Max. °C. | 150 to 650 | 250 to 550 |
| Regeneration Cycle, Hr | 0.1 to 1,000 | 1 to 500 |

The VOC are adsorbed on the adsorbent physically in the "liquid" state and reactive for oxidation, particularly, in the presence of metallic oxidation catalysts. The takeoff temperature to start the oxidation reaction depends on the nature of the VOC itself and can range between about 100 and 500° C. For example, the takeoff temperatures for aldehydes and alcohols are lower than those for hydrocarbons. When the $O_2$ concentration of treated gas is lower than that required, the regeneration gas is made-up with part of the cool treated gas from the adsorption reactor and ambient air, so the temperature of regeneration gas is lower than the takeoff temperature to start the regeneration. The regeneration gas can be heated to the takeoff temperatures by means of heaters, heat exchangers, in-line heaters or blending with the hot regenerator exhaust from line 33 as shown in FIG. 1. On the other hand, if $O_2$ content of the treated gas from the adsorption reactor is higher than required, a proper amount of this treated gas is mixed with hot regenerator exhaust gas to form the regeneration gas. In this case, the regeneration gas will be too hot, so that some heat can be recovered from the hot regenerator exhaust gas for use elsewhere before mixing it with the treated gas to form the regeneration gas It is noted that the regeneration gas has to be heated to the takeoff temperature to start the regeneration at the beginning of the cycle only. Thereafter, the regenerator can sustain its reaction without need of external heating the regeneration gas The VOC is reactive for catalytic oxidation. Since the heat of reaction heats up the whole gas in the regenerator, the regenerator can runaway in temperature, particularly, if the adsorbent is loaded with high levels of VOC. A regenerator in commercial operation had caught fire because of temperature runaway. To avoid this runaway problem, the adsorbent loading at the plant is now limited to a low level of 0.7%, leading to reduced treating capacity and inefficient operation. In the present invention, limiting the oxygen concentration of the regeneration gas solves this safety problem. By limiting the oxygen concentration in the regeneration gas, the rate and extent of reaction and thus, heat of reaction is limited and the regenerator temperature can be under control. The appropriate oxygen concentration of the regeneration gas ranges between 0.1 and 20%, and 0.5 to 10% is preferred.

The rate of regeneration is determined by the flow rate of the regeneration gas containing the set level of oxygen concentration for safe operation as described above. It is desirable to control the regeneration rate, and in turn, the cycle length of regeneration to match that of the adsorption cycle. In the present invention, the regeneration cycle is made it shorter than that of the adsorption cycle, so that there is a short period of regeneration without burning to get the regenerator cooled down for the next adsorption cycle. The regeneration cycle length can be in a range of 0.1 to 1,000 hrs, and preferably, 1 to 500 hrs. The flow rate of regeneration gas depends on the level of VOC loading on the adsorbent and can be in a range of 0.01 to 100 GHSV (g/g Hr) and preferably, 0.05 t0 50 GHSV (g/g Hr.)

EXAMPLES

Example 1

To test the adsorption capacity, 10 g. of the adsorbent was packed into a tubular reactor of ¼ in. I.D. and 10 in long. Upon heating in $N_2$ gas at 150° C. for 1 hr, the simulated effluent containing 1,000 ppm of iso-propanol (VOC) was passed through the reactor at 10 GHSV and 25° C. The treated gas from the reactor was analyzed every 5 min for iso-propanol (VOC). The iso-propanol (VOC) concentrations of the treated gas were plotted against the volume of the feed passed through the reactor. When 10 ppm of iso-propanol (VOC) broke through, representing 99% VOC removal, the total volume of simulated effluent passed through the reactor up to this point was recorded. The adsorption capacity is calculated as follows:

Adsorption Capacity=VOC conc., g/g×Effluent Gas Density, g/cc×Broke-through Volume, cc ÷Adsorbent Weight, g Adsorption Capacities Simulated Effluent. ppm: 1.000, iso-propanol (balance air)
Temperature, ° C.   25   Pressure, psig: 0
Flow rate. GHSV. g/g. Hr   10

| Adsorbent | Adsorption Capacity, g/g | Surface Area, $m_2/g$ |
|---|---|---|
| Pd/USY | 0.12 | 800 |
| $Al_2O_3$ (Alumina) | 0.02 | 150 |
| Spent FCC catalyst | 0.09 | — |

The adsorption capacities of zeolites containing adsorbents, Pd/USY and spent FCC catalyst are higher than the amorphous $Al_2O_3$ based on their surface areas. It is believed that the zeolites have special affinity for VOC, such as iso-propanol.

Example 2

To test the takeoff temperature, the adsorbent loaded with 10 wt % of iso-propanol (VOC) was placed in a TPO (Temperature Programmed Oxidation) machine. While passing through the simulated regeneration gas, 10% $O_2$ in $N_2$, at a slow rate, heating is started. On the record chart of temperature vs. time, an exothermic peak appears. The temperature corresponding to the start of the peak is the takeoff temperature.

| Adsorbent | Metal/Conc., wt % | Takeoff Temperature, ° C. |
|---|---|---|
| USY | No metal | 500 |
| USY | Pd/0.2. | 230 |

The presence of oxidation catalyst, such as precious metals, Pd and Pt lowers the takeoff temperature significantly. It is desirable to lower the takeoff temperature to make it possible to lower the regeneration gas temperature at the inlet or to increase the $O_2$ concentration of the regeneration gas without overheating the regenerator. In addition, the presence of oxidation catalyst is desirable to make the regeneration more complete, that is, lower carbon residue in the regenerated adsorbent. Thus, precious metal/USY such as Pd/USY and Pt/USY of present invention is dual functional as oxidation catalyst and adsorbent Example 3

For application of the present invention to a specific case, these parameters can be calculated based on the data available from the Laboratory and the literature, and shown by way of an example:

Absorber Operation Condition

| Process Parameter | |
|---|---|
| VOC (iso-Propanol), ppm | 500 |
| Adsorption Capacity, w/w | 0.12 |
| Temperature, ° C. | 30 |
| Pressure, psig | 0 |
| Cycle length, Hrs | 120 |
| GHSV, g/g · Hr | 1 |

Regenerator Operating Conditions

| Parameters | |
|---|---|
| Takeoff Temperature, ° C. | 230 |
| O2 Conc. in Reg. Gas, % | 2 |
| Reg. Gas, GHSV, W/W · Hr | 0.13 |
| Delta T, Max. ° C. | 245 |
| Regenerator Temp., Max., ° C. | 475 |
| Regeneration Cycle, Hr | 110 |

In this example, the GHSV is chosen at 1, so that the adsorption cycle is 120 hours. Such a long adsorption cycle is made possible by choosing a zeolitic adsorbent, USY. It is highly desirable to operate the adsorber at a longer cycle, in comparison to the rotatable bed adsorber because the operation costs and the wear and tear of the adsorbent can be reduced. In the regeneration cycle, the oxygen content is chosen at 2 wt % to limit the maximum temperature to 475° C. to protect the regenerator and the adsorbent. The regeneration gas rate is chosen at 0.13 GHSV so that the regeneration cycle will be 110 hrs to match the adsorption cycle of 120 hrs. The 10 hrs after the regeneration is the cooling time for the adsorbent bed to get ready for the next adsorption cycle.

The example 3 is for the purpose of showing typical operation parameters only. The process is flexible and can be optimized to meet the need of the local operation. For example, the $O_2$ content of the regeneration gas can be increased from 2 wt % in the example 3 to, say 2.5 wt %, to decrease the GHSV of regeneration gas from 0.13 to 0.104 to save the pumping cost of the regeneration gas. With this change the delta T in the regenerator will increase from 245 to 305° C. and the max. regenerator temperature will increase from 475 to 535° C. Since the adsorbent and the regenerator can withstand a max. temperature of 535° C., it might be more desirable to run it with regeneration gas at 2.5 wt % $O_2$ concentration.

Changes and modification in the specifically described embodiment can be carried out without departing from the scope of the invention, which is intended to be limited only by the scope of the appended claims

We claim:
1. A process for continuously removing and destroying volatile organic compounds (VOC) from industrial and commercial effluent consisting steps of:
  a. packing a fixed bed absorber and a fixed bed regenerator in series with high surface area adsorbent,
  b. introducing said effluent to said absorber for adsorption of VOC to obtain a clean treated effluent, c. venting part of said clean treated effluent from said absorber to the atmosphere, d. blending part of said clean treated effluent with air to an appropriate level of oxygen to form a regeneration gas, e. bringing said regeneration gas to a takeoff temperature and charging said regeneration gas to said regenerator whose adsorbent is loaded with VOC from previous adsorption cycle, f. converting VOC to innocuous compounds to form hot regenerator exhausting gas for venting to the atmosphere and regenerating said adsorbent, simultaneously, g. switching said absorber to become a regenerator and said regenerator to become an absorber to start a new cycle of operation just before VOC breakthroughs said absorber, whereby said effluent is continuously cleaned of VOC for venting to the atmosphere.

2. A process according to claim 1, wherein said regeneration gas is formed by blending part of said clean treated effluent with part of said regenerator exhausting gas to form a regeneration gas with an appropriate level of oxygen and temperature.

3. A process according to claim 1, wherein said hot regenerator exhausting gas is further mixed with air for complete combustion in a trim catalytic combustor before venting to the atmosphere.

4. A process according to claim 1, wherein the surface area of said adsorbent is greater than 50 $m^2/g$.

5. A process according to claim 1, wherein said adsorbent is activated carbon, alumina, zeolites or their mixtures.

6. A process according to claim 5, wherein a silica/alumina ratio of said zeolites is greater than 10.

7. A process according to claim 1, wherein said adsorbent is incorporated with metallic oxidation catalyst.

8. A process according to claim 1, where said adsorbent is spent solid catalyst from processes including FCC, hydrocracking, hydrodesulfurization, and hydrogenation.

9. A process according to claim 1, wherein a regeneration temperature is controlled by controlling an oxygen concentration of said regeneration gas.

10. A process according to claim 1, wherein said oxygen concentration of said regeneration gas is between 0.5 and 10%.

11. A process according to claim 1, wherein said regeneration gas is heated to a takeoff temperature by blending it with said hot regenerator exhausting gas.

12. A process according to claim 1, wherein said regeneration gas is made up with air and said hot regenerator exhausting gas.

13. A process according to claim 1, wherein a regeneration cycle length is controlled to be shorter than an adsorption cycle by 0.5 to 20 hrs.

14. A process according to claim 1, wherein a regeneration cycle length is controlled by flow rate of said regeneration gas to match said adsorption cycle length.

15. A process according to claim 1, wherein VOC breakthrough is detected by installing a combustible gas detector in the absorber near the outlet.

16. A process according to claim 1, wherein said regeneration gas flow is continued after completion of regeneration reaction to cool said regenerator down for use as an absorber in next operation cycle.

* * * * *